United States Patent [19]

Hyder et al.

[11] Patent Number: 5,037,508

[45] Date of Patent: Aug. 6, 1991

[54] ALUMINUM CHLOROHYDRATE OR HYDROTALCITE TREATED KAOLIN CLAYS FOR PITCH CONTROL

[75] Inventors: Walter J. Hyder, Lizella; Albert C. Kunkle; Robert M. Weaver, both of Macon, all of Ga.

[73] Assignee: J. M. Huber Corporation, Rumson, N.J.

[21] Appl. No.: 500,989

[22] Filed: Mar. 29, 1990

Related U.S. Application Data

[62] Division of Ser. No. 109,881, Oct. 19, 1987, Pat. No. 4,927,465.

[51] Int. Cl.$^5$ .................... D21C 9/08; D21H 17/69
[52] U.S. Cl. .......................... 162/181.2; 162/181.4; 162/181.5; 162/181.8; 162/199; 162/DIG. 4
[58] Field of Search .............. 162/181.8, 199, DIG. 4, 162/181.5, 181.6, 181.3, 181.2, 181.4; 501/146, 148, 147, 144, 145; 106/486

[56] References Cited

U.S. PATENT DOCUMENTS

| | | | |
|---|---|---|---|
| 3,801,433 | 4/1974 | Windle | 162/DIG. 4 |
| 3,947,125 | 8/1976 | Oswald et al. | 260/40 R |
| 4,105,466 | 8/1978 | Kunkle et al. | 106/309 |
| 4,317,737 | 3/1982 | Oswald et al. | 252/28 |
| 4,365,030 | 12/1982 | Oswald et al. | 523/508 |
| 4,629,712 | 12/1986 | Pinnavaia et al. | 502/63 |
| 4,640,764 | 2/1987 | Hamilton, Jr. | 208/110 |
| 4,659,571 | 4/1987 | Loba | 424/65 |
| 4,711,727 | 12/1987 | Matthews et al. | 162/181.3 |
| 4,740,488 | 4/1988 | Fogler et al. | 502/84 |
| 4,860,599 | 11/1982 | Loken et al. | 501/147 |

FOREIGN PATENT DOCUMENTS

WO87/00544  1/1987  Int'l Pat. Institute .
WO89/06294  7/1989  Int'l Pat. Institute ........ 162/DIG. 4
2025914  1/1980  United Kingdom .

OTHER PUBLICATIONS

Oades, "Interactions of Polycations of Aluminum and Iron with Clays", Clays and Minerals, vol. 32, No. 1, pp. 49-57, 1984.

Doner et al., "Stability of Aluminum-Hydroxy Polycation Treated Illite and Montmorillonite Suspensions", abstract, p. 36, Sep. 18-21, 1988.

Nolan et al., "Binding of Chlorinated Dioxins and Biphenyls from Aqueous Solution to Clays and Hydroxy Aluminum Polymers", abstract, p. 47, 9/18-21/88.

Srinivasan et al., "Use of Modified Clay Adsorbents for the Removal of Priority Pollutants from Industrial Wastewaters", abstract, p. 102, 9/18-21/88.

Gill, "Controlling Pitch Deposits in Pulp Mills with Talc", Pulp Processing, vol. 48:9 (Aug. 1974), p. 104.

Kaiser, "The Use of Talc to Control Pitch Deposition", Tappi Conference Paper: Alkaline Pulping Test, 1976, St. Regis Paper Company, pp. 133-134.

Hughes, "A Method for Determining the Pitch Adsorption Characteristics of Mineral Powders", Tappi, vol. 60:7, (Jul. 1977), pp. 144-146.

Primary Examiner—Richard V. Fisher
Assistant Examiner—Todd J. Burns
Attorney, Agent, or Firm—Harold H. Flanders; Alec H. Horn; Robert L. Price

[57] ABSTRACT

Kaolin clay treated with 0.5 to 1.5 wt. % of aluminum chlorohydrate or a double hydroxide of aluminum and magnesium are an effective pitch adsorption agent for use in paper making processes.

9 Claims, 1 Drawing Sheet

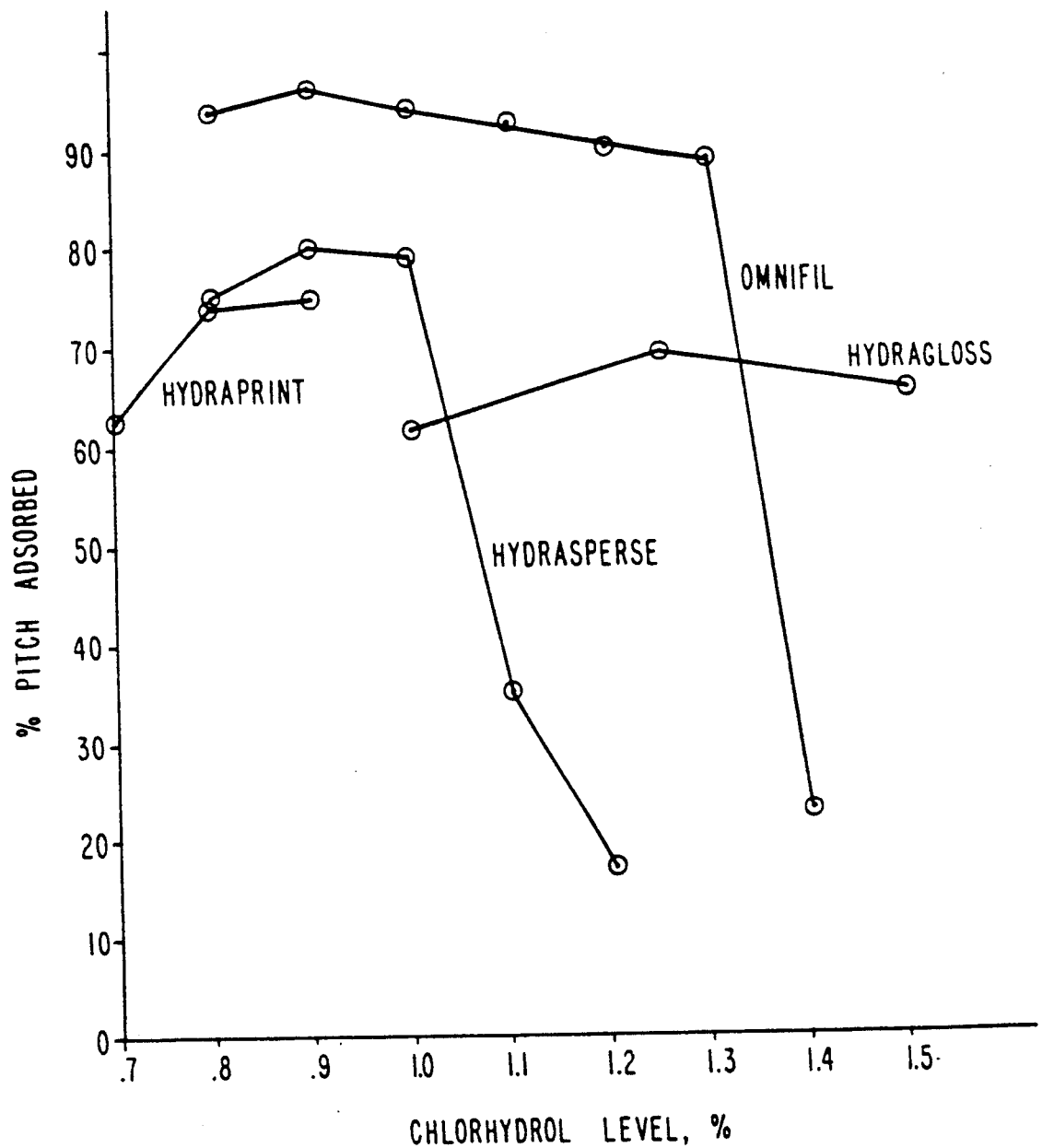

ALUMINUM CHLOROHYDRATE OR HYDROTALCITE TREATED KAOLIN CLAYS FOR PITCH CONTROL

This application is a division of application Ser. No. 109,881, filed Oct. 19, 1987, now U.S. Pat. No. 4,927,465.

FIELD OF THE INVENTION

This invention relates to the control of pitch deposition in paper making operations, and more particularly relates to the use of modified kaolin clays for control of pitch deposition in paper making operations.

BACKGROUND OF THE INVENTION

In the operation of a pulp mill in the production of paper, one of the recurring problems is control of the pitch which is deposited during the operation. Pitch is the sticky, resinous substance of varying composition which originates from the extractive fraction of wood in the paper making process. Pitch is reported to be composed of fatty acids and rosin acids and their corresponding calcium, magnesium, and sodium salts. The pitch exists in its dispersed state until chemical changes in the paper furnish cause it to agglomerate and deposit on screens, felts or other paper machine surfaces. This results in holes or breaks in the sheet and expensive down time for clean ups. It is reported that the paper industry loses 30 million dollars annually because of lost production caused by pitch problems. Though various measures have been taken to combat these problems, by far the most effective measure taken to the present date is the use of talc to adsorb the pitch, thereby preventing agglomeration and subsequent deposition. The talc pitch complex is carried out as part of the final product so that no problem arises from its presence. There is discussion of this problem by Gill in "Pulp Processing", Vol. 48, No. 9 (Aug., 1974) p. 104. In addition, there is disclosed in *Tappi Conference Paper: Alkaline Pulping Test* 1976 a publication by Albert R. Kaiser of St. Regis Paper Company on "The Use of Talc to Control Pitch Deposition", pps. 133–134.

Use of talc as a pitch deposition control agent, however, is expensive because of the price of talc, so there is a need to increase efficiency of such pitch deposition controls, while at the same time increasing cost savings in operation of the process.

SUMMARY OF THE INVENTION

It is accordingly one object of the present invention to provide a method for the control of pitch which is deposited in paper making processes.

A further object of the invention is to provide a modified kaolin clay for use in the control of pitch in paper making systems.

A still further object of the invention is to provide a modified kaolin clay which has been treated with aluminum chlorohydrate or hydrotalcite (or hydrotalcite analogues which are magnesium-aluminum double hydroxides of varying [Al]/[Al]+[Mg] molar ratios), which modified kaolin clay is useful in the control of pitch in a paper making process.

Other objects and advantages of the present invention will become apparent as the description thereof proceeds.

In satisfaction of the foregoing objects and advantages, there is provided by this invention a kaolin clay which has been treated with aluminum chlorohydrate or hydrotalcite or analogue, either in the dry form or slurry form, said treated kaolin clay being useful for the control of pitch deposition in a paper making process.

There is also provided by the present invention a method for the adsorption of pitch and thus the control of pitch deposition in a paper making process which comprises addition of an aluminum chlorohydrate-treated kaolin clay or a hydrotalcite-treated kaolin clay to the paper furnish.

BRIEF DESCRIPTION OF THE DRAWING

Reference is now made to the drawing accompanying this application wherein the figure is a graph showing a comparison of different clays and their treatment levels of aluminum chlorohydrate with respect to the amount of pitch adsorbed.

DESCRIPTION OF PREFERRED EMBODIMENTS

As indicated above, this invention is concerned with modification of kaolin clay and use of the modified kaolin clay as a pitch control agent in the paper making industry. According to this invention it has been unexpectedly discovered that kaolin clays can be chemically modified to improve their pitch adsorption characteristics so that they can serve as replacements for talc in the paper making industry and provide increased efficiency and cost savings.

In accordance with this invention it has been discovered that a kaolin clay which has been modified by treatment with aluminum chlorohydrate or a hydrotalcite will provide normally inert kaolin clay with qualities which enables the resulting modified clay to have pitch adsorption characteristics which makes the modified clay eminently suitable as a pitch adsorption agent in paper making processes.

Kaolin clays are well known materials and various kaolin clays are mined throughout the southeast and are identified, for example, by the region from which they are obtained, such as middle Georgia clays and east Georgia clays. All such clays are considered to be useful within the scope of the present invention.

The kaolin clay according to the present invention is modified by treatment with either aluminum chlorohydrate or hydrotalcite. Aluminum chlorohydrate is a known material and is also referred to as an aluminum chlorohydroxide complex. It is of the formula $Al_2(OH)_5Cl.2H_2O$. Aluminum chlorohydrate is sold commercially under the name Chlorhydrol® by Reheis Chemical. As available commercially, Chlorhydrol® is a clear, colorless 50% solution and is preferably used in that form in this invention. However, other physical forms of the aluminum chlorohydrate may also be used in treatment of the clay.

In the present invention the clay may be treated in dry form with the aluminum chlorohydrate or it may be treated as a slurry. It is highly preferred that the modified clay be prepared in slurry form, since test results have shown that the slurry treatment process is a more simple procedure and the nature of slurry treatment lends itself to more uniform mixtures. Thus, this represents the preferred procedure.

It has been discovered that both fine particle size (90–99% finer than $2\mu$), high surface area (22 $m^2/gm$) clays and coarse particle size (80% finer than $2\mu$ or lower), low surface area clays (12 $m^2/gm$ or less) respond equally well to treatment with aluminum chlorohydrate to produce effective pitch control agents. Further, it has been found that degritted crude clays as well as fractionated and leached beneficiated clay fractions can be effectively treated with aluminum chlorohydrate to produce pitch control products. It is preferred that crude clay or fractionated clay slurries contain a minimum amount of dispersant (preferably 0.1–0.15% of Calgon) prior to treatment with aluminum chlorohydrate, and that leached beneficiated clay fractions be treated with aluminum chlorohydrate as undispersed filter cake slurries. Further, the amount of aluminum chlorohydrate which should be used to treat the clay should range from about 0.5 to 1.5 wt.% and more preferably from about 0.75 to 1.25 wt.%. It has been found that this minimum amount of aluminum chlorohydrate is effective to modify the clay in such manner that the resulting modified clay excels as a pitch control agent.

The treatment of the kaolin clay with the aluminum chlorohydrate is preferably carried out by forming a clay slurry at a solids content of about 15 to 50 wt.%, preferably 30%. Thereafter, with agitation, sufficient aluminum chlorohydrate, such as a 30 to 60 wt.% solution, and preferably a 50 wt.% solution, is added to give a total treatment level based on the clay weight of 0.5–1.5%, and preferably 0.75 to 1.25%. The treated slurry is then blunged for about 5 to 60 minutes, preferably 10 to 20 minutes, and then is either spray dried or filtered and either dried as a cake or reslurried at 30% solids and spray dried. It has been found that the treated slurry may be stored for several days prior to drying without affecting the pitch adsorption properties.

The modified clay may also be formed from a dry clay by treatment with aluminum chlorohydrate. In this procedure, the aluminum chlorohydrate suspension is added directly to dry clay to achieve uniform and thorough mixing and a resultant moistened clay. The resultant treated clay is either oven dried or dried using a rotary dryer/flash dryer combination and milled to the desired fineness of grind.

While either slurry treatment or dry treatment of the clays may be used, use of the slurry process is preferred since it is a comparatively simple process and the nature of slurry treatment lends itself to more uniform mixing. Dry treatment of the clays requires a great deal of mixing to ensure uniformity and proper distribution of the aluminum chlorohydrate and higher drying costs may be encountered. For these reasons, the slurry treatment is preferred.

In a second embodiment of the present invention, the clay may be treated with a double hydroxide of magnesium and aluminum to modify the clay in a manner to make it useful as a pitch control agent. The recognized mineral form of magnesium and aluminum double hydroxide is called hydrotalcite and is of the formula $Mg_6Al_2(OH)_{16}CO_3.4H_2O$. The term hydrotalcite will be used to refer to the recognized mineral form as well as hydrotalcite analogues which are magnesium-aluminum double hydroxides of varying molar ratios.

According to this invention it is preferred that the clay be treated with hydrotalcite-like materials which have been produced in-situ from aluminum chloride and magnesium chloride. In this reaction, the in situ formation of the hydrotalcite in a clay slurry is achieved by the addition of desired quantities of 1.0M $AlCl_3$ and 1.0M $MgCl_2$ to a 10 to 30 percent solids aqueous clay slurry, preferably 20% solids, and blunging to achieve good mixing. A time of about 5 to 15 minutes, preferably 10 minutes, is preferred. Thereafter, sodium hydroxide, such as 2M aqueous sodium hydroxide solution, is slowly added to achieve a pH in the range of 10.0 to 11.0, preferably 10.5. The slurry is then blunged for 5 to 15 minutes and filtered as on a Buchner funnel. The filter cake is then reslurried at 20 to 40 wt.% solids, refiltered and dried at 120° C., then hammer-milled to desired fineness of grind. The treatment level will depend on the ratio of aluminum and magnesium and the percent alumina, as well as percent magnesium oxide per 100 parts of clay. The following represents a sample calculation to achieve a proper treatment level for in situ formation of the hydrotalcite.

Sample Calculation of Treatment Level for in situ Formation of Hydrotalcite

Treatment Level:  $Al/Al + Mg = .67\%$  $Al_2O_3 = .68\%$
  $\%\ MgO = .27\%$
ml 1.0 M $AlCl_3$ added to 200 g clay = 26.8
ml 1.0 M $MgCl_2$ added to 200 g clay = 13.3
26.8 ml 1.0 M $AlCl_3$ = 26.8 m mole $AlCl_3$ – 13.4 m mole $Al_2O_3$
13.4 mole $Al_2O_3 \times 102$ mg $Al_2O_3$/m mole = 1.367 g
1.367 g $Al_2O_3$/200 g clay = .68 g $Al_2O_3$/100 g clay
13.2 ml 1.0 M $MgCl_2$ = 13.2 m mole $MgCl_2$ – 13.2 ml MgO
13.2 m mole MgO $\times$ 40.3 mg MgO/m mole MgO = .532 g
.532 g MgO/200 g clay = 0.267 MgO/100 g clay $$\frac{g\ Al_2O_3/100\ g\ clay \times 4000}{102} = ml\ 1.0\ M\ Al_2Cl_3$$

$$\frac{g\ MgO/100\ g\ clay \times 2000}{40} = ml\ 1.0\ M\ MgCl_2$$

It will be seen from this calculation that the clay is treated with an amount of hydrotalcite which can range from 0.5 to 2.0 wt.%.

The results of laboratory tests indicate that clay modified with aluminum chlorohydrate or hydrotalcite have pitch adsorption qualities equal to, and in most cases superior to, those of the more expensive talc. Thus, an aluminum chlorohydrate-kaolin combination was found to adsorb up to 96.25% of the synthetic pitch in test systems, as compared to a 35–45% adsorption by talc. The treated clay performed satisfactorily in paper filler applications. Chemical modification of the clay slurry using the in situ formation of hydrotalcite was also shown to be effective in pitch adsorption. However, the aluminum chlorohydrate treatment is more preferred in this invention since hydrotalcite modified clays appeared to provide less consistent results than the aluminum chlorohydrate modification. Also, the hydrotalcite modification involves a multistep process, which is less economic than the aluminum chlorohydrate.

In order to evaluate the modified clay as a pitch control agent, test procedures were utilized to evaluate the pitch adsorptive capacity of the agents. This laboratory evaluation allowed direct measurement of adsorbed pitch on the test samples. The adsorbed pitch was extracted from the modified clays and reacted to form a colored pitch complex whose concentration could be measured spectrophotometrically. The results were reported as percent of total amount of pitch adsorbed and were compared with the 45% adsorptive capacity exhibited by talc. The method of evaluation of the pitch adsorptive capacities of mineral powders was a variation of a procedure outlined by D. A. Hughes in Tappi Conference Papers, Vol. 60, No. 7, p. 144–146 (1977), the disclosure of which is incorporated herein by reference. This involves the mixing of a known quantity of a synthetic pitch with a dilute mineral solution. The mineral and any adsorbed pitch is then separated by centrifugation. The liquid fraction is discarded while the mineral powder is dried. A solvent reagent is then added to the dry mineral to extract the adsorbed pitch which may be present. The pitch is then quantified colorometrically. In general, the results indicated that Mistron vapor talc adsorbs about 40–45% of the synthetic pitch, untreated kaolin clay adsorbs less than 1%, and aluminum chlorohydrate-modified clay adsorbs up to 96.25%, so that the effectiveness of the aluminum chlorohydrate treated clay is clearly apparent. This is shown in the drawing accompanying the application where HSP, HP, HG and Omnifil are as defined in the examples.

The following examples are presented to illustrate the invention. However, it is not to be considered as limited thereto, as obvious variations thereon will become apparent to those skilled in the art. In the examples and throughout the specification, parts are by weight unless otherwise indicated.

In the following examples, the clays to be treated are referred to by the tradenames Hydrasperse ®(HSP), Hydraprint ®(HP), Hydragloss ®(HG), Hydrafine ®(HF), and Omnifil ®. These terms are trademarks of the J. M. Huber Corporation for the types of clays utilized. The aluminum chlorohydrate used in the examples was a colorless 50% aqueous solution obtained from Reheis Chemical under the trademark Chlorhydrol ®.

In these examples the effectiveness of pitch control powders was evaluated by permitting contact between specially prepared synthetic pitch and the pitch control powder in an aqueous system. The adsorbed pitch was extracted from the powder and quantified colorimetrically. It is difficult to extract actual pitch from a problem area in a paper mill and utilize that pitch for evaluation, so that synthetic pitch was prepared from actual components of typical pitch. The experimental procedure of the pitch preparation and evaluation involved preparing a synthetic pitch sample by combining 0.65 grams of ground gum rosin and 0.35 grams of tall oil in an Erlenmeyer flask. The oily mixture was then stirred with a glass stirring rod while 1M potassium hydroxide was added dropwise until saponification resulted. Denatured ethanol (250 ml) was added to dissolve the synthetic pitch. The resulting concentration of the pitch preparation is 4 mg/ml.

The pitch adsorption test procedure comprised slurrying 10 grams of the test clay in a Waring blender with 400 ml distilled water for 10 minutes. 35 ml of distilled water was first added to 50 ml glass centrifuge tubes, followed by 1 ml of the synthetic pitch preparation, and lastly 10 ml of the clay slurry. The mixture was then stirred with a stirring rod for 15 seconds and centrifuged for 20 minutes at 2500 rpm. The supernatant was then poured off and discarded and the tube containing the mineral powder and adsorbed pitch was dried overnight at 60° C.

After drying, 10 ml of chloroform-acetic anhydride (1:1) reagent was added to the tube and stirred to release the adsorbed pitch from the mineral powder. The mixture was then centrifuged for 20 minutes so that the clear reagent remained at the top of the tube. The clear reagent was poured off into a small beaker and 10 drops of concentrated sulfuric acid added to effect a color change. After exactly four minutes, the liquid was measured on a spectrophotometer set at 400 nm and the absorbance value was compared to absorbance values of known quantities of extracted pitch.

EXAMPLE 1

A fine particle size east Georgia crude clay having a particle size of about 90% finer than two microns was slurried as approximately 40% solids using 0.15% by weight sodium hexametaphosphate as the dispersant. The dispersed slurry was degritted on a 325 mesh screen and the degritted slurry divided into eight equal samples. Chlorhydrol ® was added to the samples at levels ranging from 0.8 to 1.4% by weight active Chlorhydrol ® to weight of clay. The control sample contained no Chlorhydrol ®. Each treated sample was mixed for three minutes under low shear using a dispersator equipped with a cowles type blade. The treated samples were dried on a teflon coated pan, milled, and evaluated for pitch adsorption characteristics using the modified Hughes method. Results of the tests are given in Table I.

TABLE I

Effect of Chlorhydrol ® on Pitch Adsorption of Treated East Georgia Degritted Clay

| Treatment Level lbs/t Chlorhydrol ® | Percent Pitch Adsorbed |
| --- | --- |
| 0 | 10.0 |
| 16 | 93.75 |
| 18 | 96.25 |
| 20 | 93.75 |
| 22 | 92.50 |
| 24 | 90.0 |
| 26 | 88.75 |
| 28 | 22.50 |
| Mistron Vapor Talc | 45.0 |

The results show maximum pitch adsorption at 0.9% Chlorhydrol ® with values decreasing with higher and lower Chlorhydrol ® levels. In comparison the untreated clay sample showed 10.0% pitch adsorption while a Mistron Vapor talc showed 45.0% adsorption.

EXAMPLE 2

An undispersed leached filter cake sample of a middle Georgia clay having a particle size of about 82–84% finer than 2 microns was obtained for treatment with Chlorhydrol ®. An undispersed slurry was prepared from the filer cake at 30% solids by adding water to the filter cake while mixing under moderate shear. The slurry was divided into eight equal portions and treated with Chlorhydrol ® in the same manner as Example 1.

TABLE II

Effect of Chlorhydrol ® on Pitch Adsorption of Treated Hydrasperse ® Filter Cake

| Treatment Level lbs/t Chlorhydrol ® | Consistency of Treated Slurry | Percent Adsorbed |
| --- | --- | --- |
| 16 | Very thick | 75 |
| 18 | Thick | 80 |
| 20 | Slightly Thick | 79 |
| 22 | Slightly Fluid | 35 |
| 24 | Moderately Fluid | 17.5 |
| 26 | Fluid | <10 |
| 28 | Quite Fluid | <10 |

Results of the test given in Table II show a maximum adsorption of a treatment level of 18 lbs./t decreasing drastically at levels above 20 lbs./t. In comparison the untreated control had less than 10% pitch adsorption and Mistron Vapor had 45% pitch adsorption. The results would indicate that the coarser particle size middle Georgia clays are more sensitive to overtreatment than the fine particle east Georgia clays.

EXAMPLE 3

A degritted east Georgia clay slurry was prepared in the same manner described in Example 1. The slurry was divided in half and each half treated with 1% Chlorhydrol®. One-half was mixed for about 15 minutes and spray dried. The second-half was filtered on bottle filters, placed in a forced air oven and dried. Both samples were evaluated for pitch absorption by the modified Hughes method.

The results shown in Table III indicate that some Chlorhydrol® was lost during the filtration but that the resulting pitch adsorption of the treated clay was still substantially higher than the value for talc while lower than the value for the unfiltered sample.

EXAMPLE 4

An unbeneficiated Hydrasperse® slurry prepared from middle Georgia crude clay and having a particle size of about 84% minus two microns was obtained and treated in the same manner as described in Example 3. Pitch adsorption characteristics as determined by the Modified Hughes method is given in Table III.

TABLE III

Effect of Filtering Treated Slurry on Pitch Adsorption of East Georgia Clay

| Example | Percent Pitch Adsorbed | |
|---|---|---|
| | Spray Dried, As Is | Filtered Oven Dried |
| Omnifil ® (Example 3) | 82.5 | 73.0 |
| Hydrasperse ® (Example 4) Georgia | 66.0 | 47.5 |

The filtered middle Georgia sample had a pitch adsorption value significantly lower than the unfiltered control indicating a substantial loss of treating chemical. The pitch adsorption value was still equivalent to talc which has a pitch adsorption capacity of about 35–45%. The decrease in pitch adsorption due to filtration was greater for the middle Georgia clay than for the east Georgia clay.

EXAMPLE 5

A leached Hydragloss® clay sample was obtained as filter cake from the rotary vacuum filter and the filter cake reslurried at 25% solids and divided into two samples. The first sample was treated with 20.0 lbs./t of Chlorhydrol® to produce a flowable slurry and spray dried. The second sample was first dispersed with 0.15% of sodium hexametaphosphate dispersant (available commercially as Calgon Dispersant), and then treated with 20 lbs./t of Chlorhydrol® before spray drying. The pitch adsorption characteristics of the two samples determined by the modified Hughes method are given in Table IV.

TABLE IV

Treatment of Hydragloss ® Filter Cake with Chlorhydrol ®

| Sample | Calgon Dispersant % | Chlorhydrol ® % | Slurry | Pitch Adsorption % |
|---|---|---|---|---|
| 1 | — | 1.0 | fluid | 82.5 |
| 2 | .15% | 1.0 | thick | 69.0 |

The results show that good pitch adsorption characteristics can be obtained by treating reslurried filter cake with sufficient Chlorhydrol® to obtain a good slurry flow or by treating dispersed filter cake slurry with Chlorhydrol®.

EXAMPLE 6

A crude east Georgia Clay was obtained and dispersed at about 40% solids using sodium hexametaphosphate as the dispersant. Dispersant levels of 2, 4, 6 and 8 lbs./t of clay were employed. The dispersed slurries were degritted and solids reduced to 25%. Each slurry was then treated with 20 lbs./t of active Chlorhydrol® and pan dried. Pitch adsorption for the four samples, as determined by the modified Hughes method is given in Table V.

TABLE V

Effect of Dispersant on Pitch Adsorption of Degritted East Georgia Clay

| Dispersant Level, % Calgon | Slurry Consistency | Pitch Adsorption, % |
|---|---|---|
| .10 | Moderately Fluid | 82.5 |
| .20 | Moderately Thick | 85.0 |
| .30 | Thick | 82.5 |
| .40 | Very Thick | 75.0 |

Very little difference in pitch absorption was observed for the four samples, however, the lower level of dispersant would be preferred. A difference in the consistency of the treated slurries was observed with the sample containing the least amount of dispersant being the most fluid and the sample containing the greatest amount of dispersant being the most viscous.

EXAMPLE 7

A coarse centrifuge underflow fraction from a middle Georgia clay having a particle size of 30% minus 2 microns and a surface area of 8.5 $m^2$/gm was treated with from 8 to 21 lbs. Chlorhydrol® per ton of clay and the treated slurries pan dried. The pitch adsorption characteristics of the treated clays are given in Table VI.

Maximum pitch adsorption was obtained with 15 lbs./t of Chlorhydrol®, indicating that a suitable pitch adsorption product could be produced from a coarse underflow fraction.

EXAMPLE 8

Leached Hydraprint® filter cake, which is a delaminated clay produced from middle Georgia clays, was treated with Chlorhydrol® at 30% solids and spray dried. The Hydraprint® fraction had a surface area of 11.3 $m^2$/gm and a particle size of 72% minus 2 microns. Results of the test are given in Table VI.

TABLE VI

Pitch Adsorption of Treated Underflow Clay

| Clay | Chlorhydrol ®, lbs./t | Pitch Adsorbed, % |
|---|---|---|
| Centrifuge | 8 | 9.0 |
| Underflow | 12 | 17.5 |
| Underflow | 15 | 70.0 |
| Underflow | 18 | 67.5 |

TABLE VI-continued

Pitch Adsorption of Treated Underflow Clay

| Clay | Chlorhydrol ®, lbs./t | Pitch Adsorbed, % |
|---|---|---|
| Underflow | 21 | 10.0 |
| Hydraprint ® | 15 | 62.5 |
| Hydraprint ® | 18 | 74.0 |
| Hydraprint ® | 21 | 75.0 |

The results of the test indicated good pitch adsorption characteristics at a treatment level of 18 to 21 lbs./t.

EXAMPLE 9

A degritted east Georgia clay slurry was treated with Chlorhydrol ® at levels ranging from 5 to 18 lbs./ton of clay. The treated slurries were pan dried and evaluated for pitch adsorption characteristics using the modified Hughes method. Results of the tests are given in Table VII.

TABLE VII

Pitch Adsorption of East Georgia Clay Treated With Different Levels of Chlorhydrol ®

| Chlorhydrol ®, lbs./t | Pitch Adsorption, % |
|---|---|
| 5 | 10 |
| 10 | 37.5 |
| 12 | 74 |
| 15 | 78 |
| 18 | 75 |
| 20 | 82.5 |

The results indicate that good pitch adsorption characteristics can be obtained by treating degritted east Georgia clays with as little as 12 lbs./t of Chlorhydrol ® but that maximum adsorption is obtained with at least 20 lbs.ton.

EXAMPLE 10

An undispersed middle Georgia Hydrasperse ® fraction was treated with 18 lbs./t of Chlorhydrol ® and pan dried in an aluminum electric frying pan as well as a teflon coated pan. The slurries were dried to about 5% moisture and then to dryness in an oven. The sample dried in the uncoated pan had a pitch adsorption value of 69% while the sample dried in the teflon coated pan had a value of 80%, indicating that the Chlorhydrol ® interacted with the aluminum during drying.

EXAMPLE 11

A fine particle, high surface area airfloated clay from South Carolina was treated neat with Chlorhydrol ® using a Vee Blendor. The treated clay products containing 0.75, 1.0 and 1.5% Chlorhydrol ® were oven dried, milled and evaluated for their pitch adsorption capabilities using the modified Hughes method. The samples treated with 0.75, 1.0 and 1.5% Chlorhydrol ® gave pitch adsorption values of 85, 24 and 20% respectively. The sample tested with 0.75% Chlorhydrol ® had a pitch adsorption capacity of about twice that of talc.

EXAMPLE 12

The in situ formation of hydrotalcite in clay slurries was most successful for pitch control when utilizing undispersed starting clays. In this example a study was conducted of hydrotalcite formation in a predispersed Hydrafine ® slurry prepared from production spray dried clay, as well as both dispersed and undispersed slurries prepared in the laboratory from undried Hydrafine ® filter cake. While production Hydrafine ® and the dispersed Hydrafine ® filter cake produced similar results of 28.75 and 30% adsorption, respectively, the undispersed Hydrafine ® produced 42% adsorption levels. These results are shown in the following Table VIII.

TABLE VIII

| Clay | Al/Al + Mg | Hydrotalcite % Al₂O₃ | % Mgo | % Pitch Adsorbed | |
|---|---|---|---|---|---|
| Hydrafine ® Production | .46 | 1.02 | 1.0 | 28.75 | Production |
| Hydrafine ® | .44 | 1.02 | 1.0 | 30 | Dispersed, treated |
| Filter cake | .44 | 1.02 | 1.0 | 42 | Undried, undispersed |
| | .44 | 1.02 | 1.0 | 42 | Dried undispersed |

EXAMPLE 13

A similar test with production Hydraprint ® along with Hydraprint ® filter cake collected from the plant was conducted. In this test, treated Hydraprint ® from production exhibited a 35% adsorption capacity, while the dispersed filter cake yielded a 30% adsorption value. Undispersed treated Hydraprint ® filter cake provided 41% adsorption. These results are shown in the following Table IX.

TABLE IX

| Clay | Al/Al + Mg | Hydrotalcite % Al₂O₃ | % Mgo | % Pitch Adsorbed | |
|---|---|---|---|---|---|
| Hydraprint ® Production | .44 | 1.02 | 1.0 | 35 | Production |
| Hydraprint ® | .44 | 1.02 | 1.0 | 30 | Dispersed, treated |
| Filter cake | .44 | 1.02 | 1.0 | 41 | Dried, undispersed |

EXAMPLE 14

The treatment of dispersed clays with hydrotalcite was found to be less effective than treatment of clays devoid of dispersants. It was found that the dispersion of previously treated clays rendered the once effective pitch control clay with essentially no adsorptive capacity. The Hydrasperse ® filter cake treated with the hydrotalcite adsorbed 47.5% of the pitch in test systems, but the addition of dispersant destroyed the adsorptive capacity of the product. These results are shown in Table X, which is as follows:

TABLE X

| Clay | Al/Al + Mg | Hydrotalcite % Al₂O₃ | % Mgo | % Pitch Adsorbed | |
|---|---|---|---|---|---|
| Hydrasperse ® | .44 | 1.02 | 1.0 | 47.5 | Treated, undispersed |
| Filter cake | (control) | | | 0 | |

EXAMPLE 15

In order to evaluate the effectiveness of the Chlorhydrol ® and hydrotalcite treatment, treatments with other compounds were carried out. In these treatments, the Hydragloss 90 ® and Omnifil ® clays were treated with octyl, methyl, vinyl and monoamino silanes by dry mixture. The only silane treatment that yielded any adsorption was the octyl silane. On Hydrasperse ® clay, the adsorption value is 20%, while on Omnifil ® and Hydragloss 90 ® clays, the adsorption values were 17.5 and 12%, respectively. These low values were not considered competitive in the market.

EXAMPLE 16

Treatments with other compounds for comparison purposes are listed in Table XI. In this work a Hydrasperse ® slurry was treated with the materials listed in the Table. From the Table it will be noted that the treatment of the Hydrasperse ® with alum yielded 43.75% adsorption. However, alum was not considered as a candidate for treatment of the clay for pitch control because it is used as a pitch control agent alone, and in conjunction with other chemicals for pitch control in the absence of clay.

In the other examples, kaolin clay was treated with zinc chloride and sodium hydroxide in quantities to form monohydroxy zinc, $Zn(OH)^+$, for cation exchange bonding to the clay surface. The treatment yielded 45% pitch adsorption.

Most of the other materials reacted with the clay did not provide any pitch adsorption. The last three examples in Table XI involved treatment of Omnifil ® with 3 MeQMBHT and Araquad quaternary amines. Good adsorption values were realized. However, these quaternary treated products were very hydrophobic and were incompatible with water systems. Therefore, no further consideration was given to this method of treatment. Table XI is as follows:

TABLE XI

| Clay | Other Treatments Treatment Type | % Pitch Adsorbed | |
|---|---|---|---|
| Hydrasperse ® | Alum | 43.75 | |
| | Al-acetate | — | |
| | ZnO | — | |
| | Mg. Silicate | — | |
| | $ZnCl_2$ | — | |
| | $Al_2O_3$ | — | |
| | $Zn(OH)^+$ | 45 | |
| | Mirapol Al5 | — | |
| | $NiSO_4$ | — | |
| | $NiCl_2$ | — | |
| | U-care Polymer JR-125 | — | |
| | JR-400 | — | |
| | MB2HT | 46.25 | quat |
| | Araquad 12-50 | 35 | quat |
| | Al formate | 16.75 | |

EXAMPLE 17

Samples of Chlorhydrol ®-treated clay and hydrotalcite-treated clays with exceptional pitch adsorption capabilities were submitted to the paper testing laboratory for evaluation in filler applications. The evaluation demonstrated that the pitch control clays were acceptable in paper filler applications. The specific results are set forth below. In these studies, the Chlorhydrol ® treated clay was a degritted east Georgia crude clay slurry (Area W) treated with 1.0 wt.% of Chlorhydrol ®. The hydrotalcite was a Hydrafine ® clay, wherein the undispersed, undried filter cake was treated with hydrotalcite formed in situ using 1.02% $Al_2O_3$ and 1.0% MgO. These results are as follows:

TABLE XII

Evaluation of Optical Properties of Filled Paper Using Clays Modified for Pitch Control Handsheets were prepared from the following furnish:

| | |
|---|---|
| Pulp | 70% Groundwood 30% Bleached Softwood Kraft |
| Freeness | Kraft to 400 CSF, then blend with Groundwood |
| pH | Alum to pH 4.5 |
| Retention Aid | Betz 1260, 0.025% on furnish |
| Filler Loading | 2.5, 5 and 10% |
| Basis Weight | 50 g/m (40#/ream) |

RESULTS:

RETENTION STUDY - No retention aid used

| | RETENTION, % |
|---|---|
| Area W control | 46.9 |
| Area W Chlorhydrol ® | 53.1 |
| Hydrafine ® Control | 48.0 |
| Hydrafine ® Hydrotalcite | 52.7 |
| Talc | 60.3 |

| | Brightness % | Whiteness % | Opacity % | Pigment % | Retention % |
|---|---|---|---|---|---|
| Unfilled | 64.0 | 43.5 | 95.3 | — | — |
| 2.5% Filler | | | | | |
| Area W Control | 63.5 | 42.5 | 96.0 | 2.56 | 73.1 |
| Area W Chlorhydrol | 63.6 | 42.8 | 95.9 | 2.79 | 79.6 |
| Hydrafine Control | 63.6 | 42.9 | 96.2 | 2.65 | 75.6 |
| Hydrafine Hydrotalcite | 62.9 | 41.7 | 95.9 | 2.56 | 73.1 |
| Talc | 63.3 | 42.8 | 95.9 | 2.24 | 74.8 |
| 5% Filler | | | | | |
| Area W Control | 63.9 | 42.2 | 96.2 | 5.19 | 79.8 |
| Area W Chlorohydrol | 64.1 | 43.2 | 96.1 | 4.96 | 82.7 |
| Hydrafine Control | 64.1 | 43.4 | 96.1 | 4.66 | 77.6 |
| Hydrafine Hydrotalcite | 63.8 | 42.7 | 96.4 | 4.72 | 78.7 |
| Talc | 63.5 | 43.2 | 95.8 | 4.54 | 75.7 |
| 10% Filler | | | | | |
| Area W Control | 64.6 | 44.5 | 96.3 | 9.89 | 82.4 |
| Area W Chlorohydrol | 64.7 | 44.6 | 96.4 | 9.51 | 82.7 |
| Hydrafine Control | 65.4 | 45.5 | 96.4 | 10.44 | 83.5 |
| Hydrafine Hydrotalcite | 65.3 | 45.5 | 96.8 | 10.35 | 86.2 |
| Talc | 64.4 | 44.2 | 95.9 | 9.62 | 64.1 |

EXAMPLE 18

In a production run, approximately 20 tons of dried pitch control clay were produced utilizing degritted Area W crude clay which has been treated with 26 pounds of Chlorhydrol ® per ton of clay. On evaluation as described above, the pitch adsorption capacity of the resulting product was found to be 74%, which illustrates that the invention can be carried out on a large scale for commercial use.

The invention has been described herein with reference to certain preferred embodiments. However, as obvious variations thereon will become apparent to those skilled in the art, the invention is not to be considered as limited thereto.

What is claimed is:

1. A method for adsorbing pitch in a paper making process which comprises adding to a paper furnish a component which adsorbs pitch, said component being selected from the group consisting of an aluminum chlorohydrate-treated kaolin clay and a hydrotalcite-treated kaolin clay.

2. A method according to claim 1, wherein up to 75 wt.% of the pitch is adsorbed by the aluminum chlorohydrate-treated kaolin clay or hydrotalcite-treated kaolin clay.

3. A method according to claim 2, wherein the treated kaolin clay contains from 0.5 to 1.5 wt.% of aluminum chlorohydrate or hydrotalcite.

4. A method according to claim 2, wherein the treated kaolin clay is dispersed or undispersed treated kaolin clay.

5. A method according to claim 4, wherein the dispersed or undispersed kaolin clay contains from 0.75 to 1.25 wt.% of aluminum chlorohydrate.

6. A method according to claim 2, wherein the treated kaolin clay has been treated with 0.5 to 1.5 wt.% of aluminum chlorohydrate.

7. A method according to claim 2, wherein the treated kaolin clay has been treated with hydrotalcite in a reaction mixture, wherein the hydrotalcite is formed in situ in the reaction mixture by the reaction of aluminum chloride, magnesium chloride and sodium hydroxide.

8. A method according to claim 2, wherein the treated kaolin clay is formed by reaction of a slurry of kaolin clay with an aqueous solution of aluminum chlorohydrate in sufficient amounts to provide a kaolin clay product containing 0.5 to 1.5 wt.% aluminum chlorohydrate.

9. A method according to claim 2, wherein the treated kaolin clay is kaolin clay which has been dry mixed with aluminum chlorohydrate solution to provide an aluminum chlorohydrate level of 0.5 to 1.5 wt.%.

* * * * *